United States Patent Office 3,168,504
Patented Feb. 2, 1965

3,168,504
PROCESS FOR POLYMERIZATION OF OLEFINS
Leon B. Gordon and Truman P. Moote, Jr., Tulsa, Okla., assignors, by mesne assignments, to Standard Oil Company, Chicago, Ill., a corporation of Indiana
No Drawing. Filed Mar. 27, 1958, Ser. No. 724,262
2 Claims. (Cl. 260—93.7)

The present invention relates to novel catalyst compositions and to their use in the polymerization of olefins. More particularly, it is concerned with the use of such catalysts in preparing olefinic polymers ranging in consistency from oils to partially crystalline solid substances.

We have discovered that olefin hydrocarbons such as, for example, ethylene, propylene, the pentenes, styrene, and the like, can be polymerized separately or conjointly under relatively mild conditions in the presence of our new catalysts to produce oils and/or solid polymers. These catalysts are made up of three components, namely a silicon compound, a difficultly reducible metal oxide and an organometallic compound or an alkali metal hydride of boron or aluminum. When these three components are mixed, a reaction occurs as is frequently evidenced by the generation of heat and a darkening of the mixture. The mechanism by which such reaction takes place is unknown to us.

Preparation of our catalyst is effected in the presence of a suitable solvent usually, such as, for example, a saturated hydrocarbon, preferably with a boiling range of from about 80° to about 215° C. While certain liquid aromatic hydrocarbons may be suitable as solvents for the preparation of our catalyst, such materials frequently tend to become alkylated with the olefin it is intended to polymerize under the conditions employed. Accordingly, it is generally preferable to remove the aromatic solvent from the catalyst prior to use of the latter in the process of our invention. In general it may be said that any of the well-known solvents such as chlorinated hydrocarbons, and the like, which are inert with respect to the reactants involved, and which boil generally within the above stated range, are likewise suitable for use in the preparation of our catalyst. Such solvents also may be employed in carrying out the principal polymerization reaction.

The preferred form in which silicon is used in carrying out the process of our invention is the tetrachloride, however, other silicon compounds such as, for example, the tetrabromide and the tetraiodide may also be used. In addition, various hydrocarbon derivatives of silicon may be substituted for the silicon tetrahalides mentioned above. As examples of such derivatives there may be mentioned dimethyl dibromosilane, dimethyl dichlorosilane, trimethyl bromosilane, tetramethyl silane, diphenyl dichlorosilane, phenyl methyl dichlorosilane, and the like.

The second component of our novel catalyst system is the difficultly reducible metal oxides such as, for example, silica-alumina, vanadium pentoxide, titania, zirconia, and the like. While members of the class which we designate the second component of our system have not been found to exhibit catalytic activity either by themselves or in combination with only one other component of our catalyst system, they definitely coact with the other two components thereof to produce a catalyst having characteristic ability to polymerize unsaturates of the type contemplated herein. For example, we have been unable to obtain polymers in instances where we used the following pairs of components as the catalyst: $V_2O_5$ and $Al(i\text{-}Butyl)_3$, $Al(i\text{-}Butyl)_3$ and $SiCl_4$, and $V_2O_5$ and $SiCl_4$.

The third component involved in our new catalysts is an organometallic compound, a hydrocarbon derivative of boron or an alkali metal hydride of boron or aluminum. The organometallics useful in preparing our catalyst constitute a wide variety of compounds. The metals in the organometallic compounds contemplated are taken from groups IA to IIIA and IIB of the Periodic Chart of the Elements. Organometallic compounds derived from the following metals may be used in preparing the catalyst employed in the process of our invention: Li, Na, K, Rb, Mg, Ca, Zn, Al, Ga, In, Tl, or mixtures of such derivatives. Typical of such compounds are $NaAl(C_3H_7)H_3$, $Zn(C_2H_5)_2$, $LiC_4H_9$, $C_2H_5MgI$, phenyl magnesium bromide, $C_4H_9ZnI$, $LiAl(C_2H_5)H_3$, organoaluminum compounds, such as the trialkylaluminums, the triarylaluminums, preferably the lower molecular weight derivatives such as triisobutylaluminum, triethylaluminum, triamylaluminum, and the like.

Hydrocarbon derivatives of boron which may be used in practicing our invention, includes the alkyl borons and the aryl borons. Examples of such compounds are trimethyl boron, triethyl boron, tributyl boron, tridecyl boron, and the like. Typical of the aryl borons that may be employed are triphenyl boron, tritolyl boron, tri-p-xylyl boron, trinaphthyl boron, and the like.

The aluminum and borohydrides, making up the alternate third component, likewise constitute a large group of materials. As examples of these compounds there may be mentioned $NaAlH_4$, $LiBH_4$, $NaBH_4$, $LiAlH_4$, together with complex metal hydrides such as $NaAl(C_3H_7)H_3$, mentioned above.

Based on our observations, the molar ratios of first, second and third components do not appear to be critical and, accordingly, may be varied rather widely. A suitable molar ratio of these first, second and third components has been found to be about 1.5 for the ratio of the first to the second component, and about 3.3 for the proportion of the first to the third component. The weight ratio of catalyst to olefin can be varied ordinarily from about 0.01 to about 10 weight percent.

In using the catalyst of our invention, we have observed that a more active catalyst is ordinarily produced if the first and second components are first mixed and allowed to stand for a period of time, say from about one-half to about twenty-four hours prior to mixing with the third component which is usually already in the solvent. We have noticed the phenomenon to be particularly characteristic of silicon tetrachloride-vanadium pentoxide mixtures. Greater activity is exhibited in the final catalyst if that oxide is permitted to stand in contact with the silicon compound for a period of time, for example, from one to twenty hours, at room or elevated temperature (preferably at 60° to about 200° C.) in the presence of a suitable solvent. Thereafter the third component can be added as described herein. We have noted that the technical grade vanadium pentoxide, when used in accordance with our invention, gives a more active catalyst than the C.P. grade material. Chemically, the main difference in these two grades of vanadium oxide appears to be that the technical grade contains 5 weight percent sodium. The X-ray diffraction pattern of the C.P. grade is typical of vanadium pentoxide. On the other hand, the diffraction pattern for the technical grade has no resemblance to the expected pattern for vanadium pentoxide. The C.P. grade, however, is operative in our catalyst system.

A further outstanding feature of our invention is that in the case of metal oxides such as vanadium pentoxide, they do not have to be supported in our particular catalyst system to yield a catalyst exhibiting a marked degree of activity.

The catalyst compositions of the type produced as outlined above, are active to form products polymerized to varying degrees. With the particular catalyst system we have discovered, we have observed that when vanadium pentoxide or its substantial equivalent, ammonium vanadate, is used as the second component, the product obtained is generally a solid. With other of the second components in our system, the products are usually oils, although in the case of ethylene, a solid product is frequently obtained.

While in most instances it is usually desirable to use these olefins in as pure form as possible, mixtures of such olefins can also be employed and other substances inert under the polymerization conditions utilized can be present. For example, the crude product stream from the dehydrogenation of a normally gaseous paraffin hydrocarbon may be used directly in the process of our invention. Likewise, refinery fractions of ethylene, propylene, butylenes or mixtures of such fractions, may be used if desired. Such materials should generally be polymerized in the absence of contaminants which react with either the catalyst or with the reactants themselves.

Our process may be practiced over a wide range of temperatures and will be found to vary to some extent with the reactants and the activity of the catalyst. Polymerization temperatures ordinarily, however, come within a range of from about $-30°$ to about $300°$ C., such as from $30°$ to $250°$ C., preferably $60°$ to $150°$ C.

The pressures utilized likewise may vary rather widely. High molecular weight olefins may be polymerized in accordance with our invention, at atmospheric pressure. With normally gaseous olefins, superatmospheric pressure is generally desirable in order to provide an adequate concentration of olefin to contact the catalyst in the reaction medium. In general, polymerization of olefins, as practiced by our invention, may be conducted at pressures varying from atmospheric to 10,000 p.s.i.a. and above. In the majority of instances, however, pressures of the order of 15 to about 1500 p.s.i.a. are usually preferred.

While our invention may be effected by bringing into contact the catalyst and olefin under the above-stated reaction conditions, with the olefin in the gaseous, vapor or liquid phase, we ordinarily prefer to conduct our process in the liquid phase with the aid of a solvent, when necessary. This solvent should be a relatively inert substance such as saturated aliphatic hydrocarbons starting, for example, with heptane; cyclic hydrocarbons such as tetralin, cyclohexane, and the like; and ethers such as ethyl ether, butyl ether, tetrahydrofuran, 1,4-dioxane, dioxolane, and the like. Aromatic solvents such as toluene, the xylenes, the cymenes, and the like, should not be used in the process of our invention because we have found that our catalyst functions not only to promote the polymerization of olefins but likewise is capable of catalyzing the alkylation of aromatics with certain olefins.

The products produced by the process of our invention can be worked up in accordance with a variety of methods. If the polymer is a liquid, the reaction mixture, after the run has been discontinued, is washed with dilute acid and then with water. This serves to decompose the catalyst and to allow the product to separate from the solution of catalyst and water in the form of an upper organic layer. Solvent, if present, also is a part of the upper layer. The latter is then recovered and filtered, if suspended solids are present. The resulting clear, generally water white solution of product in solvent is next subjected to distillation, preferably under reduced pressure, and the polymerized product is usually recovered in the fractions boiling at $200°$ C. (@ 5 mm.) and above. However, lower molecular weight, low boiling product is also produced. These oils may vary in molecular weight from about 200 to about 750 or 800.

The oily products may, if desired, be produced continuously, for example, by pouring a solution of the first and third catalyst components, preferably in heptane or equivalent solvent, into a column packed with the second component. The preparation of catalyst, reactants and solvent may be in the ranges taught above. The effluent from the column is taken to a flash tank where the silicon compound may be recovered overhead for re-use and the residue subjected to low pressure fractionation to secure the oily product. Unconverted olefin and solvent are then recycled as a solution to the reaction column after the necessary amounts of catalyst components one and three have been added to said solution.

When the product is normally a solid, the final reaction mixture is emptied into an acidified alcohol solution, preferably a methanol-hydrochloric acid solution, whereupon the polymer is precipitated. After standing in this solution, usually from about one to about twenty-four hours, during which time occluded catalyst is dissolved out of the precipitate, the mixture is filtered or decanted. Thereafter, the product is washed with a suitable non-aqueous solvent such as acetone or methanol, to remove any water that might be present. The product thus treated may, if desired, be further contacted in slurry form with acetone, methanol or a similar agent, in a high speed mixer, to remove the last traces of water. Thereafter the slurry is filtered and the residue (product) further purified by extraction with a hot, for example, $80°$ to $250°$ C., solvent such as a xylene mixture to separate the polymer from ash forming impurities and similar contaminants. In addition to xylene as a solvent in this purification step, there may also be mentioned benzene, toluene, various mineral oils, and the like. The solution of polymer is then poured into an anhydrous, low molecular weight alcohol, such as methanol, and the substantially pure solid product precipitated.

The degree of purification required will, of course, depend to some extent at least on the intended use of the product. In cases where large quantities of polymer, i.e., in excess of about 100 grams per gram of catalyst, are produced, it may not be necessary to remove the catalyst at all from the polymer.

Although our invention is directed primarily to the polymerization of olefins, it is also to be pointed out that our catalysts also function as isomerization catalysts. Thus we have observed that with some of the olefins such as, for example, 1-pentene, both the cis and trans 2-pentene isomers are produced in substantial amounts. Also the solvent is, to an extent, in some instances converted to various of its isomers.

The process of our invention may be further illustrated by the following specific examples:

*Example 1*

A total of 4.0 grams of silica-alumina cracking catalyst, 8.9 grams of silicon tetrachloride, 1.8 grams of triisobutyl-aluminum and 40 ml. of n-heptane, was charged to a 100 ml. pressure-resistant glass flask under a nitrogen atmosphere. Propylene was charged to the flask to a pressure of 50 p.s.i.g. and the mixture stirred. There was an immediate exothermic temperature rise from room temperature to $118°$ C. The reaction was continued for a total of about four hours. After separation of the product from the catalyst, the mixture was fractionated and 34 grams of a light straw colored oil product was obtained. Approximately 8 percent of this product boiled below heptane, while the remainder boiled above $98°$ C.

Control runs using identical operating conditions, as set out immediately above, were made with silica-alumina alone, silicon tetrachloride and triisobutylaluminum, silica-alumina and silicon tetrachloride, and silica-alumina and triisobutylaluminum. No spontaneous temperature rise was noticed in any of these control runs. External heat was added and maintained at $120°-130°$ C. over the reaction period. Distillation of the hydrocarbon phase showed no polymer.

*Example 2*

Two grams of silica-alumina and 4.2 grams of silicon tetrachloride were mixed and allowed to stand at room temperature for approximately twenty minutes. Thereafter, this mixture was added to a solution of 0.9 gram of triisobutylaluminum in 29 ml. of n-heptane. Propylene was charged to the mixture to generate a pressure of 51 p.s.i.g. and the reaction temperature almost immediately increased to 120° C. The reaction was continued for approximately forty-eight hours to yield 70 grams of a light straw colored oil, having an indicated molecular weight (by freezing point method) of 366.

*Example 3*

To a 100 ml. pressure-resistant glass flask was added 2 grams of silica-alumina, 4 grams of silicon tetrachloride and 1.7 grams of triisobutylaluminum in 25 ml. of heptane. The flask was closed and pressured to 50 p.s.i.g. with ethylene. The temperature increased to 150° C. and was maintained at that level for a period of eighteen hours. Solid polyethylene was recovered.

*Example 4*

A 100 ml. flask containing 3.3 grams of ethyl magnesium bromide, 2 grams of silica-alumina, 4 grams of silicon tetrachloride and 50 ml. of n-heptane, was pressured with propylene to 95 p.s.i.g. The temperature was observed to increase from room temperature up to 80° C. where it was maintained with stirring for a period of twelve hours. After the flask was cooled, the contents thereof were added to a methanol-hydrochloric acid solution to recover solid polypropylene.

*Example 5*

A 100 ml. flask containing 1 gram of sodium borohydride, 2 grams of silica-alumina, 4 grams of silicon tetrachloride and 25 ml. of n-heptane, was pressured with propylene to 75 p.s.i.g. The temperature was observed to increase from room temperature up to 134° C. where it was maintained with stirring for a period of eighteen hours. A light yellow oily polymer, having an indicated molecular weight of about 400, was recovered in an amount corresponding to 1.2 grams per gram of catalyst.

*Example 6*

A 250 ml. bomb was charged with 4.2 grams of technical grade vanadium pentoxide (unsupported), 1.8 grams of triisobutylaluminum and 6.0 grams of silicon tetrachloride, dissolved in 150 ml. of n-heptane. A finely divided reddish suspension resulted. The bomb was pressured with propylene up to 155 p.s.i.g. and the temperature of the reaction mixture was increased to 90° C. These temperature and pressure levels were maintained for a period of eighteen hours, at the end of which time a solid polypropylene product was recovered in an amount corresponding to 1.1 grams of polymer per gram of catalyst. A similar run was made using only silicon tetrachloride and triisobutylaluminum as the catalyst, but no evidence of a reaction was indicated.

*Example 7*

A 100 ml. flask was charged with a solution of 0.85 gram of triisobutylaluminum, 1.2 grams of silicon tetrachloride and 2.0 grams of ammonium vanadate, dissolved in 50 ml. of n-heptane. Propylene was then added to produce a pressure of 57 p.s.i.g. resulting in a temperature rise of 75° C. These conditions of temperature and pressure were maintained for about twenty hours. Thereafter, the flask was cooled and the contents added to a methanol-hydrochloric acid solution to produce a precipitate of solid polypropylene.

*Example 8*

To a 100 ml. flask under a nitrogen atmosphere, was added 4 grams of silica-alumina, 8.9 grams of silicon tetrachloride, 15 ml. of heptane and 2 grams of triisobutylaluminum. To this mixture was added 53 grams of 1-pentene. The flask was closed and external heat applied, raising the temperature to 60° to 80° C. and generating a pressure of about 30 p.s.i.g. These conditions were maintained for a period of about sixteen hours, after which the flask was cooled and the contents water washed. The resulting upper organic layer was dried with calcium hydride, filtered and distilled to give 4.2 grams of a pot residue at a pot temperature of 200° C. and 20 mm. Hg. Analysis of the liquid polymer thus produced indicated that the molecular weight of the pot residue (by freezing point) is 272. The first 10 grams of overhead fraction obtained on distillation was found (by infrared analysis) to contain 24.5 percent cis 2-pentene and 68.5 percent trans 2-pentene. In addition, 2-methyl-2-butene, branched $C_5$ and branched $C_4$ hydrocarbons were also present. Heptane had also been isomerized.

*Example 9*

Into a glass flask was placed 4.2 grams of unsupported vanadium pentoxide, technical grade, which had been dried in air for 48 hours at 150° C. Also there was separately added 5.9 grams of silicon tetrachloride. The flask was plugged with a ground glass stopper and the mixture heated for two and three-quarter hours at 78° to 98° C., after which it was allowed to stand for about twenty-four hours at room temperature. During this period about 0.5 gram was lost and an additional 1.1 grams were lost during transfer to the reactor. Ten ml. of heptane, having 2 grams of triisobutylaluminum dissolved therein, was charged to the reactor (a 250 ml. bomb) containing 50 ml. of additional heptane. The bomb was closed and leak tested with nitrogen at 750 p.s.i.g. Thereafter the bomb was depressured and charged with 69.5 grams of propylene. The reaction was run at 85° to 90° C. for about nine and a half hours, during which time the pressure dropped from 340 to 230 p.s.i.g. The bomb was next cooled, opened and the contents dissolved in 200 ml. of xylene, after which 200 ml. of concentrated hydrochloric acid was added. The resulting heterogeneous mixture of liquid and solid polymer was allowed to stand for about twenty hours, after which the product was precipitated by adding about 500 ml. of methanol. The liquids were then decanted off and the polymer washed with acetone, slurried twice with different portions of acetone in a high speed mixer and thereafter the acetone was decanted off and the polymer allowed to air dry. The solid polymeric product thus obtained amounted to 30 grams. Thirty percent of this material was found to be crystalline, by X-ray diffraction.

*Example 10*

A 250 ml. bomb was charged with a mixture consisting of 1.5 grams of technical grade vanadium pentoxide, 50 ml. of heptane and 3 grams of silicon tetrachloride. The bomb was closed and heated at 150° C. for eighteen hours. Thereafter it was cooled and 3.2 grams of triisobutylaluminum in 25 ml. of heptane was forced into the bomb. A total of 51.5 grams of propylene was next charged to the bomb and reaction was carried out at 100° to 107° C. for a period of thirteen hours. At the end of this period the bomb and contents were cooled and polymer recovered as described in Example 9. The product obtained amounted to 24.2 grams. X-ray analysis of the material indicated that the crystalline content thereof was in the range of 30 to 40 percent.

*Example 11*

A catalyst for the polymerization of propylene was prepared by first adding 2 grams of sodium borohydride, 2 grams of silica-alumina, 3 grams of silicon tetrachloride and about 30 grams of heptane, to a 100 ml. flask. Thereafter, the mixture was stirred for ninety-two hours at room temperature and then allowed to stand for forty-eight hours at room temperature. The flask and contents were then subjected to a propylene pressure of 60 p.s.i.g., whereupon the reaction temperature spontaneously increased to a maximum of 100° C. After a period of six and one-half hours, the reaction was discontinued and the product worked-up as in Example 8. The material recovered was a light yellow oil having the following properties: $n_D^{20}$, 1.4501; $d_4^{20}$, 0.8220.

*Example 12*

A mixture consisting of 2 grams of triisobutylaluminum, 4 grams of silica-alumina and 6 grams of dimethyl dichlorosilane, was added to a 100 ml. flask containing 28 grams of heptane. Propylene was then added in an amount sufficient to produce a pressure of 50 p.s.i.g. The temperature was increased up to about 130° C., at which point reaction occurred, as evidenced by a drop in propylene pressure. Reaction was allowed to continue for a period of three hours, after which the flask and contents were cooled. Infrared analysis of the light yellow liquid product thus obtained, indicated substantial quantities of olefin polymers.

*Example 13*

A mixture consisting of 6 grams of silicon tetrachloride, 2 grams of silica-alumina, 2 grams of triisobutylaluminum and 18 grams of heptane, was added to a 100 ml. flask. To this mixture was then slowly added 40 grams of styrene at atmospheric pressure. Polymerization of the styrene was initiated. Over a reaction period of twenty minutes, a maximum temperature of 75° C. was recorded. After reaction was discontinued, the flask and contents were cooled and the polymer recovered, as described in Example 9. The product thus obtained was a white powdery material amounting to approximately 40 grams and had a minimum molecular weight of 1690.

The expression "difficultly reducible metal oxide" is intended to include a combination of such metal oxides, for example, silica-alumina, as well as the single metal oxide such as vanadium pentoxide, alumina, and the like. Also the expressions "olefins" or "olefinic hydrocarbons" are intended to refer to both a single olefin and mixtures of these hydrocarbons.

While the compositions generally discussed in the foregoing description all function as polymerization catalysts, we ordinarily prefer those in which the first component is silicon tetrachloride, the second component is either silica-alumina or vanadium pentoxide and the third component is a trialkylaluminum such as triisobutylaluminum.

The reference herein to the Periodic Chart of the Elements are to that chart appearing on pages 342–343 of the Handbook of Chemistry and Physics, 34th edition (1952).

We claim:
1. In a process for the polymerization of olefin hydrocarbons, the improvement which comprises contacting a feed comprising predominantly an olefinic hydrocarbon having from 2 to 3 carbon atoms per molecule under polymerization conditions with a catalyst consisting essentially of vanadium pentoxide, a silicon tetrahalide and a trialkyl aluminum compound, the amount of said catalyst being in the range of about 0.01 to about 10 weight percent based on the olefins in said feed.
2. In a process for the polymerization of olefinic hydrocarbons, the improvement which comprises contacting a feed consisting essentially of at least one olefinic hydrocarbon under polymerization conditions with a catalyst consisting essentially of silicon tetrachloride, vanadium pentoxide and aluminum triisobutyl.

References Cited in the file of this patent
UNITED STATES PATENTS

| | | |
|---|---|---|
| 1,671,517 | Edeleanu | May 29, 1928 |
| 2,379,687 | Crawford et al. | July 3, 1945 |
| 2,436,614 | Sparks et al. | Feb. 24, 1948 |
| 2,530,409 | Stober | Nov. 21, 1958 |
| 2,912,419 | Peters et al. | Nov. 10, 1959 |
| 2,912,423 | Peters et al. | Nov. 10, 1959 |
| 2,914,549 | Anderson | Nov. 24, 1959 |
| 2,920,062 | McFarland | Jan. 5, 1960 |
| 2,927,085 | Gordon | Mar. 1, 1960 |
| 2,927,086 | Gordon et al. | Mar. 1, 1960 |
| 2,930,785 | Edmonds | Mar. 29, 1960 |
| 2,938,000 | Wanless et al. | May 24, 1960 |
| 2,949,481 | Anderson et al. | Aug. 16, 1960 |
| 3,112,297 | Gordon et al. | Nov. 26, 1963 |